United States Patent
Maus et al.

(10) Patent No.: US 11,644,077 B2
(45) Date of Patent: May 9, 2023

(54) METHOD FOR PRODUCING BRAKE LININGS, METHOD FOR REDUCING THE DRYING TIME OF AN ADHESIVE LAYER APPLIED TO A LINING CARRIER FOR A BRAKE LINING

(71) Applicant: TMD Friction Services GmbH, Leverkusen (DE)

(72) Inventors: Dominik Maus, Hennef (Sieg) OT Uckerath (DE); Frank Gümpel, Wissen (DE); Markus Steinhauer, Bitzen (DE); Dieter Wappler, Odenthal (DE); Michael Reese, Kürten (DE)

(73) Assignee: TMD Friction Services GmbH, Leverkusen (DE)

( * ) Notice: Subject to any disclaimer, the term of this patent is extended or adjusted under 35 U.S.C. 154(b) by 332 days.

(21) Appl. No.: 17/055,700

(22) PCT Filed: Jul. 17, 2019

(86) PCT No.: PCT/EP2019/069190
§ 371 (c)(1),
(2) Date: Nov. 16, 2020

(87) PCT Pub. No.: WO2020/025316
PCT Pub. Date: Feb. 6, 2020

(65) Prior Publication Data
US 2021/0190160 A1    Jun. 24, 2021

(30) Foreign Application Priority Data
Jul. 31, 2018    (DE) .......................... 102018118441.7

(51) Int. Cl.
*F16D 69/04*    (2006.01)

(52) U.S. Cl.
CPC ...... *F16D 69/04* (2013.01); *F16D 2069/0475* (2013.01)

(58) Field of Classification Search
CPC ............. F16D 69/04; F16D 2069/0475; F16D 2069/0466
See application file for complete search history.

(56) References Cited

U.S. PATENT DOCUMENTS

| | | | |
|---|---|---|---|
| 6,284,074 B1 * | 9/2001 | Braund | B29C 43/36 156/64 |
| 8,556,532 B2 | 10/2013 | Becker | |
| 2002/0162618 A1 * | 11/2002 | Landa | F16D 69/04 156/335 |
| 2006/0204777 A1 * | 9/2006 | Landa | F16D 69/04 428/626 |
| 2007/0227842 A1 * | 10/2007 | Idei | F16D 69/04 188/251 M |
| 2019/0203791 A1 * | 7/2019 | Galimberti | F16D 69/0408 |

FOREIGN PATENT DOCUMENTS

| | | |
|---|---|---|
| DE | 19532230 A1 | 3/1997 |
| DE | 102004004827 A1 | 9/2005 |
| DE | 102008059243 A1 | 5/2010 |
| DE | 102014118973 A1 | 6/2016 |
| DE | 102015107309 A1 | 11/2016 |
| JP | 2005140256 A | 6/2005 |
| JP | 5135151 B2 | 1/2013 |

OTHER PUBLICATIONS

European Patent No. EP 0697073 to Baldwin published on Jul. 16, 1997.*

* cited by examiner

*Primary Examiner* — Pamela Rodriguez
(74) *Attorney, Agent, or Firm* — Rogowski Law LLC

(57) ABSTRACT

In a method for coating a brake lining carrier plate with an adhesive composition that is to be dried, the lining carrier plate is inductively heated to the desired drying temperature before the adhesive is applied.

8 Claims, No Drawings

METHOD FOR PRODUCING BRAKE LININGS, METHOD FOR REDUCING THE DRYING TIME OF AN ADHESIVE LAYER APPLIED TO A LINING CARRIER FOR A BRAKE LINING

CROSS-REFERENCE TO RELATED APPLICATIONS

This application is a national stage application (under 35 USC § 371) of PCT/EP2019/069190, filed Jul. 17, 2019, claiming priority to DE 10 2018 118 441.7, filed Jul. 31, 2018, the contents of each of which are incorporated by reference herein.

BACKGROUND OF THE INVENTION

Technical Field and State of the Art

The present invention relates to a method for the production of brake linings, especially disc brake linings, said method being characterized by a special gluing or drying step.

When it comes to the production of brake linings—which comprise a lining carrier that is usually made of metal (also referred to here as a lining carrier plate) and the actual friction lining—the state of the art often calls for the friction lining to be glued to the lining carrier. In other methods, the friction lining is sintered onto the lining carrier or else mechanically joined to it. The above-mentioned gluing procedure makes use of adhesives on the basis of water-soluble adhesives as well as organic solvent-based adhesives. In any case, the solvent has to be removed before the adhesive can be applied in the proper manner, that is to say, before the actual friction lining can be pressed together with the adhesive-coated surface of the lining carrier.

According to state of the art, a lining carrier is coated with adhesive at room temperature. The coating methods employed are normally rolling, spraying or screen-printing techniques. Subsequently, the adhesive layer is dried with heated air or IR radiation, or else the solvent is evaporated off so that the treated lining carrier surface can be pressed together with the friction lining ("Facts about Friction" by Geoffrey Nicholson, Retina Theme, copyright 2018).

In the context of the state of the art and for the purposes of the present invention, the term "drying" encompasses the evaporation of aqueous or organic solvents out of the adhesive and its transition from the liquid into the solid state. This transition is also referred to as gelation, through-hardening or through-drying.

During the coating and drying procedures, various rules and standards relating to the adhesive employed as well as to the technical execution of the individual process steps have to be observed.

The following are mentioned here by way of examples:
DIN 55945: Paints and varnishes—Terms and definitions for coating materials and coatings as well as DIN EN 971-1, DIN EN ISO 4618-2 and DIN EN ISO 4618-3 (DIN=Deutsches Institut für Normung [German Institute for Standardization], BGG=Berufsgenossenschaftliche Grundsatze [Principles of the German Professional Association]).

For adhesives containing solvents, it would also be necessary to comply with the German explosion-protection regulations (EX-RL) or (BGR 104) as well as to undertake the ventilation calculations for chamber dryers and continuous dryers, BGG 909 (all of the cited rules and standards in the version valid at the time of the priority date of this application).

The cited drying process is dependent on a wide array of parameters. The weight and the material of the lining carriers are of great significance in view of the associated heat conductivity. Lining carriers are made of metal and, depending on the application purpose, they vary widely in terms of their weight, and they can range, for instance, from lining carriers weighing 50 grams and used in two-wheeled vehicles all the way to cast-iron carrier plates weighing approximately 2.5 kg and used in trucks. Accordingly, the size and weight influence the drying behavior of the applied adhesive layer. Likewise significant aspects include, for example, the solids content in the adhesive, its evaporation behavior—which can vary considerably between different types of adhesive—and the requisite layer thickness of the adhesive. Moreover, some of the phenolic resin adhesives often employed in the state of the art call for a pre-condensation of the phenolic resin in order to attain optimal adhesion or gluing of the substrates, namely, the lining carrier plate and the friction lining or friction material. For this purpose, the polycondensation of the phenolic resin is already partially carried out during the drying of the adhesive and subsequently halted again by rapidly cooling off the applied adhesive.

In the day-to-day operations of brake lining manufacturers, the lining carriers are taken from an industrial warehouse, as a result of which the storage temperature, and thus the object temperature of the lining carriers, can fluctuate seasonally, for instance, between 15° C. and 35° C. During the conventional drying of the adhesive on the lining carrier surface by means of heated air or IR radiation, a skin consisting of already dried glue (the drying progresses from the outside towards the inside) is often formed on the surface of the adhesive. This prevents further controlled and uniform evaporation of the volatile glue constituents from the underlying layers.

Finally, it should be noted that an interlayer made of a third material can be present between the friction lining and the lining carrier surface, for example, for noise-damping purposes. Depending on the pair of materials used, it might be advisable for the drying of the appertaining adhesive layer or adhesive layers (lining carrier/interlayer and interlayer/friction lining) to be carried out at different temperatures. The required temperature differences often fall within a very narrow range of approximately ±3° C. relative to the object temperature of the lining carrier. Maintaining these temperature differences by means of the described conventional drying techniques quickly runs into its limits and, at the very least, translates into a time-consuming procedure.

All of the elaborations made above apply equally to water-based adhesives as well as to solvent-based adhesives.

Brake linings constitute safety components in automotive engineering and their manufacture and technical design call for special care and attention. The adhesive coating as the bonding member between the friction compound, the lining carrier and an optionally present interlayer is particularly important in this context. At the same time, however, it should be possible to produce brake linings with a cost-effective process in which, for instance, it is not necessary to accept losses due to long product changeover times.

SUMMARY OF THE INVENTION

Before this backdrop, an objective of the present invention was to put forward a method for joining the lining carrier, the friction lining and an optionally present interlayer (method for the production of a brake lining) with which the drawbacks described and known from the state of the art do not occur at all or at least only to a far lesser extent.

An improved method for the production of brake linings, or an improved method for gluing friction linings to a lining carrier or lining carrier plate, with or without an interlayer that is made of a suitable material and that is situated between the friction lining and the lining carrier, is characterized by the inductive heating of the lining carrier.

In principle, the process according to the invention can be broken down into 3 to 4 phase or zones which do not necessarily have to transpire in the sequence a) to d):
a) inductive heating of the lining carrier,
b) followed by a temperature equalization zone, which is optional,
c) coating of the lining carrier with an adhesive (water-based or solvent-based), and
d) followed by an evaporation zone.

The inductive heating of the lining carrier can be carried out before or after the carrier plate has been coated with the adhesive.

Both sequences have in common the fact that the coating is heated up starting from the lining carrier. This prevents the formation of a skin on the surface of the adhesive which might not only hinder the evaporation procedure and promote the formation and retention of residual moisture in a coating that appears to be dry but which might also promote the formation of blisters in the adhesive layer.

According to the invention, as presented in the a) to d) set-up above, preference is given to carrying out a preceding inductive heating of the carrier plate prior to the application of the adhesive.

The method according to the invention is equally suitable for water-based adhesives as well as solvent-based adhesives, whereby water-based adhesives are preferred since they do not require any additional explosion-protection measures.

DETAILED DESCRIPTION

When metals are heated by means of induction, an eddy current is generated in the workpiece that is to be heated. The energy is transferred to the metal/lining carrier by means of an inductor or a coil. These inductors and coils are available in virtually all desired configurations and are usually adapted and manufactured with an eye towards the workpiece in question. Since inductive heating introduces energy directly into the workpiece, the heat is induced exclusively in the workpiece and, unlike with other methods, it does not have to be transmitted by means of heat conduction, radiation or convection.

The physical principles of inductive heating are sufficiently known and will only be briefly summarized here:
1) When an alternating current flows through an electric conductor, a magnetic alternating field of the same frequency is formed around it.
2) When a second electric conductor, for example, a lining carrier made of metal, is placed into this magnetic field, a voltage of the same frequency is induced therein. In the second conductor, this voltage generates a current that is phase-shifted by 180° relative to the current in the first conductor.
3) Owing to Joule's law, the ohmic resistance R in the second conductor, here, for instance, a lining carrier, causes a heat quantity Q to be induced in it with a current S over time, according to:

$$Q = S^2 \times R \times t$$

In order for the induced energy to concentrate on the second conductor to the greatest extent possible, the first conductor is normally made of high-grade copper having the lowest possible ohmic resistance R. In actual practice, this first conductor is normally referred to as an inductor.

The lining carriers can be heated, for example, in an induction oven (induction dryer) which, in turn, can be part of the overall process line for the production of a brake lining. According to the state of the art, these are usually installations or devices having an open coil mounted on one side or an inductor through whose magnetic alternating field the objects to be heated—here lining carrier plates—are passed.

The essential feature of an inductive drying process consists of the fact that the substrate (here lining carriers made of metal) are heated on the inside as set forth in Joule's law. In comparison to conventional drying, for instance, by means of heated air, there is no risk of skin formation on the adhesive or coating which could hinder the evaporation or drying. Accordingly, experiments have shown that, due to the direct heating of the substrate, the required drying time can be considerably reduced.

Examples:
in the case of solvent-based adhesives—e.g. from currently 18.5 minutes to 3.5 minutes
in the case of water-based adhesives—e.g. from currently 18.5 minutes to 2.5 minutes In this context, it is immaterial whether the inductive heating of the substrate (lining carrier) takes place before or after the coating. According to the invention, before the coating with the adhesive, the lining carrier is heated to the drying temperature recommended by the manufacturer of the adhesive.

Generally speaking, it can be said that the process times for the drying step can be reduced by at least 50% in comparison to conventional methods of the state of the art.

The adhesive can be applied onto the lining carrier by means of conventional coating methods such as, for instance, spraying, rolling or screen printing. Preferably, spraying is used. In this process, by deploying robots and appropriately coordinating the spray technique with the adhesive selected, adhesive overspray can be minimized to such an extent that it is possible to dispense with recovery procedures. This translates into an environmentally friendly reduction in the amount of adhesive needed.

The temperature of the inductively heated lining carrier can be advantageously controlled or monitored by means of thermal-imaging cameras.

The inventive drying of the adhesive coating with an inductively pre-heated lining carrier plate entails a wide array of advantages when compared to the familiar methods according to the state of the art.

The temperature (initial temperature) of the lining carrier plate when it arrives for processing has no influence on the product quality. Independently of seasonal influences, the lining carrier plate is always heated to the (identical) object temperature required for optimal drying as a function of the adhesive being used. In the case of a water-based adhesive, as a rule, this falls within a temperature range of 60° C. to 65° C.

The influences exerted on the heating by the various materials used for the carrier plate such as, for example, steel or gray cast iron, as well as influences when the lining carrier plates are of different sizes and weights are eliminated with the method according to the invention. In other words, the optimal drying temperature recommended by the manufacturer is always achieved, and this temperature can easily be kept constant over the course of the likewise recommended drying period. In this context, the term drying comprises the evaporation of aqueous or organic solvents out of the adhesive as well as its transition from the liquid into the solid state. This transition is also referred to as gelation, through-hardening or through-drying.

The applied adhesive (in the form of an emulsion, dispersion or solution) dries on the lining carrier from below (starting at the surface of the lining carrier) all the way to the top. As a result, the reproducibility of the drying result is considerably improved. This reliably suppresses the detrimental skin or blister formation often observed with conventional drying employing heated air or IR radiation.

Since the inductor (e.g. coil, flat coil or individual winding of an electric conductor) itself hardly heats up in this process, but instead, only the lining carrier plates that are passed over it using a conveying means heat up, the drying temperatures can be adapted within a very short period of time (for example, in minute intervals). Moreover, the temperature constancy in the case of the method according to the invention is considerably improved as compared to conventional drying methods of the state of the art (for instance, conventional circulating air dryers). This also holds true for lining carrier plates for passenger vehicles and their wide variety in terms of their shape, material and drying temperatures. As a result, the downtimes still common nowadays for heating or cooling a conventional circulating air dryer can be eliminated.

Furthermore, the energy demand for heating the lining carriers by means of induction is about 50% to 70% below the values common today, e.g. for circulating air ovens. Besides, a high level of process safety is ensured; if the production flow of the lining carrier plates is interrupted, the inductor simply switches off.

Moreover, inductors are also well suited for use in potentially explosive areas. In this context, the relatively small steam chamber of an inductive dryer is a great advantage. As a result, the requisite number of air changes can be ensured with considerably smaller exhaust-air volumes. In this vein, the inventive method of inductive drying entails additional advantages when solvent-based adhesives are used.

The adhesive is preferably applied according to the invention by means of spraying (spray adhesive) employing robot technology. The coating is coordinated with the surface of the specific lining carrier plate that is to be coated. This accounts for a marked reduction of overspray, so that it is possible to dispense with (adhesive) recovery, which is advantageous from an environmental as well as financial point of view.

The invention claimed is:

1. A method for the production of a brake lining, comprising:
    firstly inductive heating of a lining carrier to a desired temperature; and
    then after the inductive heating to the desired temperature, coating the heated lining carrier on a side of the lining carrier facing a friction lining with an adhesive layer of a water-based adhesive or a solvent-based adhesive,
    wherein the inductive heating of the lining carrier prior to coating the heated lining carrier with the adhesive layer is sufficient to dry the adhesive layer without applying further heating after the adhesive layer is coated onto the lining carrier.

2. The method according to claim 1, characterized in that the adhesive layer is applied by rolling, spraying or screen-printing.

3. The method according to claim 1, characterized in that the desired temperature of the lining carrier is monitored by a thermal-imaging camera.

4. The method according to claim 1, characterized in that the inductive heating of the lining carrier is on a heating line, and the heating line is followed by a temperature equalization zone, and the temperature equalization zone is followed by a coating zone in which the heated lining carrier is coated with the adhesive layer, and the coating zone is followed by an evaporation zone.

5. A method for shortening drying time of an adhesive layer that is applied onto a lining carrier for a brake lining, comprising:
    firstly inductive heating the lining carrier to a requisite drying temperature before applying the adhesive layer onto the lining carrier, wherein the inductive heating of the lining carrier prior to coating the heated lining carrier with the adhesive layer is sufficient to dry the adhesive layer without applying further heating after the adhesive layer is coated onto the lining carrier.

6. The method of claim 5, wherein the adhesive is selected from the group consisting of: water-based adhesives and solvent-based adhesives.

7. The method of claim 5, wherein the requisite drying temperature is from about 60° C. to 65° C.

8. The method of claim 5, wherein the adhesive layer drying time is shortened to 3.5 minutes or less.

* * * * *